May 25, 1943. R. I. MARKEY 2,319,939
JOINT FOR EXHAUST PIPES
Filed July 10, 1942

INVENTOR.
ROSCOE I. MARKEY
BY
ATTORNEY

Patented May 25, 1943

2,319,939

UNITED STATES PATENT OFFICE 2,319,939

JOINT FOR EXHAUST PIPES

Roscoe I. Markey, East Orange, N. J., assignor to Pollak Manufacturing Company, Arlington, N. J., a corporation of New Jersey Application July 10, 1942, Serial No. 450,462

2 Claims. (Cl. 285—91)

The invention relates to joints for exhaust pipes.

It is a well-known fact that internal combustion engines develop large amounts of heat when operating, particularly air cooled engines used for aircraft. A substantial amount of this heat enters the exhaust pipes leading from the exhaust outlets of the cylinders to the exhaust manifold and causes material expansion and contraction of the exhaust manifold. When the exhaust pipes are rigidly secured to the exhaust outlets and the manifold a great deal of trouble is experienced with breaking and cracking due to the strains set up by heat expansion and contraction.

The principal object of the present invention is to provide a joint for an exhaust pipe which, while it remains absolutely tight, will permit of a certain amount of angular movement of the exhaust pipe when the exhaust manifold expands or contracts, thus relieving all strains due to heat expansion and contraction and eliminate the troublesome breaking and cracking of the exhaust pipes. The angular movement also compensates for slight inaccuracies in the parts and saves many annoying delays in assembling.

A preferred form of the invention will be described in the following specification and illustrated in the drawing forming a part thereof and in which.

Figure 2:
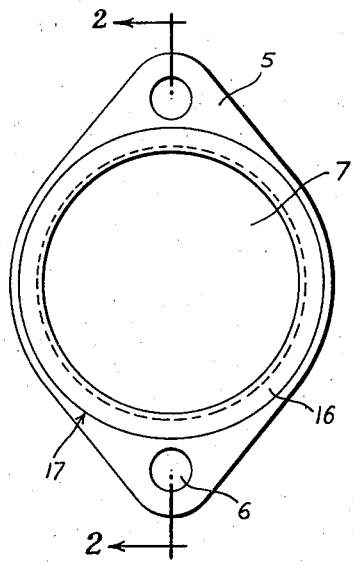
Fig. 2 is an end elevation.
Figure 1:
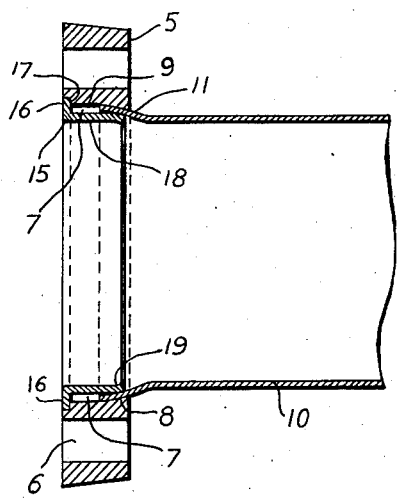
Fig. 1 is a longitudinal sectional view.
Figure 4:
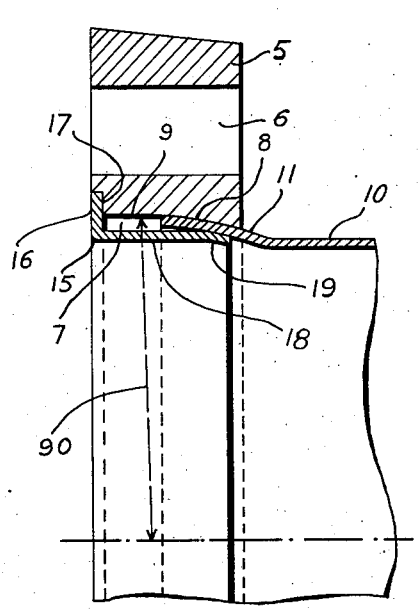
Fig. 4 is a detail sectional view taken on a larger scale.

Referring again to said drawing, the reference numeral 5 designates a flange which may be provided with openings 6 for the reception of bolts to secure the flange to the engine cylinder. The inner periphery of the opening 7 in the flange is curved for part of its depth as indicated at 8. The curve is an arc of a circle and its radius is indicated by the broken line 90 in Fig. 4. The curved or spherical portion 8 merges into a straightaway or cylindrical portion 9. It is thue thought to be apparent that this construction forms what might be termed a socket in the flange 5.

Figure 3:
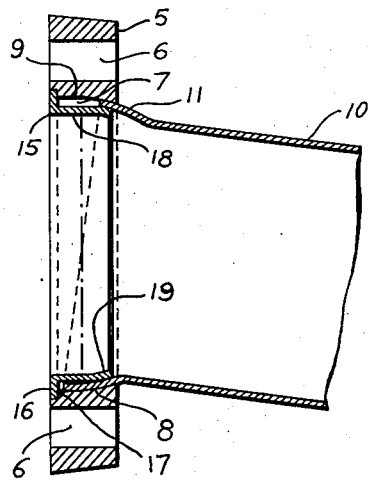
Fig. 3 is a view similar to Fig. 1, illustrating the angular movement of the pipe.

The exhaust pipe or tube 10 has a bell end 11. The curvature of this bell end coincides with the spherical portion 8 of the socket. The bell end terminates somewhat short of the center of the spherical radius of the portion 8, and thus a limited angular movement of the tube 10 is permitted in any direction. This movement is illustrated in Fig. 3 and it will be apparent regardless of the position of the tube 10 within the limits of its movement, a substantial amount of surface contact is maintained between the bell end of the tube and the socket in the flange thus insuring against the escape of gas.

To insure a more rigid construction and to prevent any possibility of axial or lonigtudinal movement of the tube 10 and to further insure against the escape of gas a ring 15 is inserted in the bell end of the exhaust tube 10. The ring has an annular flange 16 which fits in an annular groove 17 formed on the inner face of the flange 5. The ring is thus firmly held in place and an increased bearing area is provided for the gasket (not shown) between the flange 5 and the cylinder.

From the flange 16 the ring has a straightaway portion 18 which terminates in its outer end into a curved portion 19 which has the same curvature as the bell end 11 of the pipe 10. The straightaway portion 9 of the socket permits of ready assemblage of the bell end of the pipe with the flange and the curved or spherical portion 19 on the ring 15 engaging the inner side of the bell portion 11 insures against any axial movement of the pipe.

The present invention is somewhat similar to my prior Patent No. 2,206,414 dated July 2, 1940. However, in that patent longitudinal or axial movement of the exhaust pipe was provided for and in the present invention axial movement is eliminated and a larger and better surface contact is insured at all times between the bell end of the exhaust pipe and its socket.

I claim:

1. A joint for an exhaust pipe, said joint comprising a rugged flange adapted to be secured to an engine cylinder, the inner periphery of the opening in said flange being substantially straightaway for about one half of its depth and merging into a portion curved in the arc of a circle and tangent with said straightaway portion so as to form a socket, a bell end on the exhaust pipe, the curvature of the bell end coinciding with the curvature of the socket, and a ring inserted in the bell end of the exhaust pipe, said ring having a straightaway portion in close proximity to the straightaway portion of socket and terminating in a curved portion contacting with the interior of the bell end of the exhaust pipe and the curvature of which coincides with the bell end of the exhaust pipe.

2. A joint for an exhaust pipe, said joint comprising a rugged flange adapted to be secured to an engine cylinder, the inner periphery of the opening in said flange being substantially straightaway for about one half of its depth and merging into a portion curved in the arc of a circle and tangent with said straightaway portion so as to form a socket, a bell end on the exhaust pipe, the curvature of the bell end coinciding with the curvature of the socket, and a ring inserted in the bell end of the exhaust pipe, a flange on said ring, said flange engaging an annular groove formed in the inner face of the joint flange, said ring having a straightaway portion in close proximity to the straightaway portion of socket and terminating in a curved portion contacting with the interior of the bell end of the exhaust pipe and the curvature of which coincides with the bell end of the exhaust pipe.

ROSCOE I. MARKEY.